United States Patent [19]

Busot et al.

[11] Patent Number: 4,607,595

[45] Date of Patent: Aug. 26, 1986

[54] RHEOTACTIC SHRIMP HARVESTER

[75] Inventors: J. Carlos Busot, Land-o-Lakes, Fla.; Peter W. Hill, Wilmington, N.C.

[73] Assignee: The University of South Florida, Tampa, Fla.

[21] Appl. No.: 716,227

[22] Filed: Mar. 25, 1985

[51] Int. Cl.⁴ ............................................. A01K 61/00
[52] U.S. Cl. ......................................................... 119/2
[58] Field of Search ................ 119/2, 3; 209/675, 906

[56] References Cited

U.S. PATENT DOCUMENTS

| | | | |
|---|---|---|---|
| 2,643,481 | 6/1953 | Ederer | 119/3 X |
| 2,984,207 | 5/1961 | Drake | 119/2 |
| 3,735,736 | 5/1973 | Yee et al. | 119/2 |
| 3,870,018 | 3/1975 | Fruchtnicht | 119/3 |

Primary Examiner—Hugh R. Chamblee
Attorney, Agent, or Firm—William D. Stokes

[57] ABSTRACT

A rheotactic shrimp harvester wherein an inclined ramp having a slot extends between adjacent water tanks and water is caused to flow down the ramp from one tank to another. The shrimp reacting to the current of water flowing down the ramp move upstream on the ramp; the smaller shrimp pass through the slot in the ramp and return to the original tank while the larger shrimp go over the slot and into the next tank.

16 Claims, 7 Drawing Figures

U.S. Patent  Aug. 26, 1986  Sheet 1 of 2  4,607,595
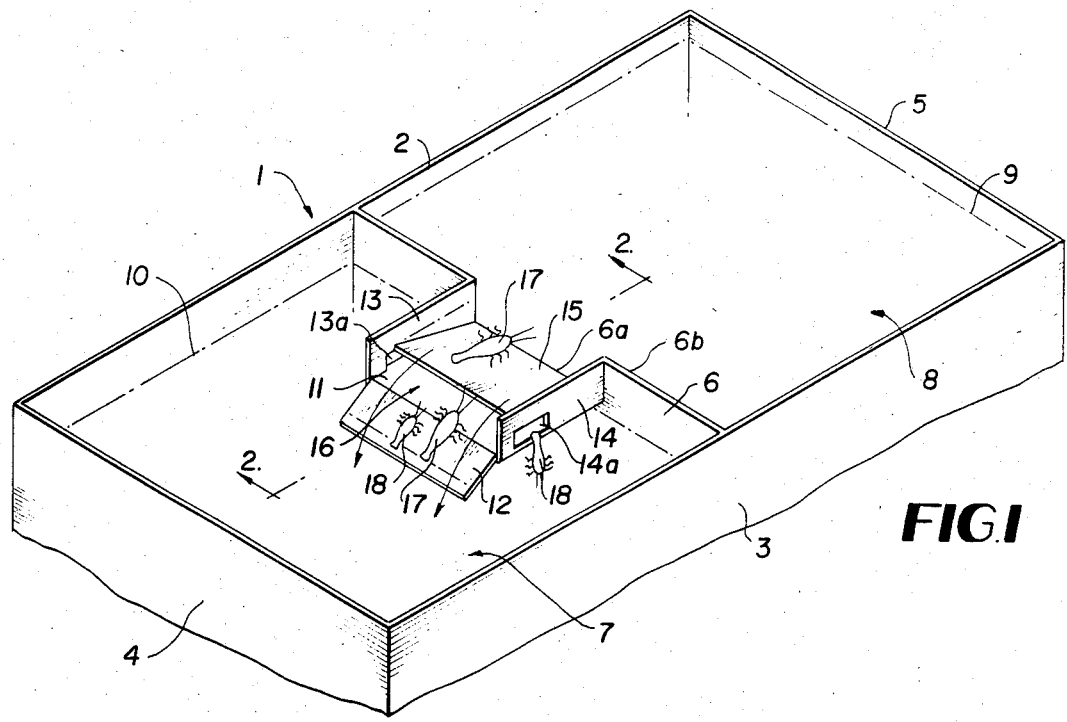
FIG.1
FIG.2
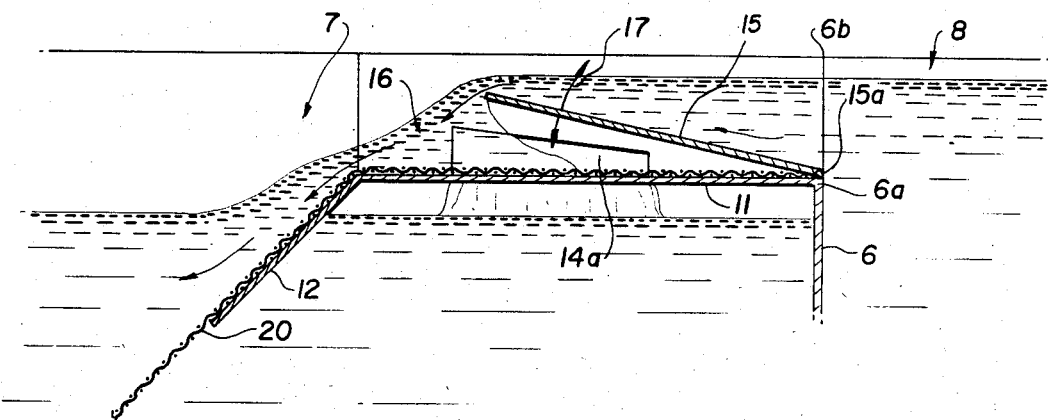
FIG.3
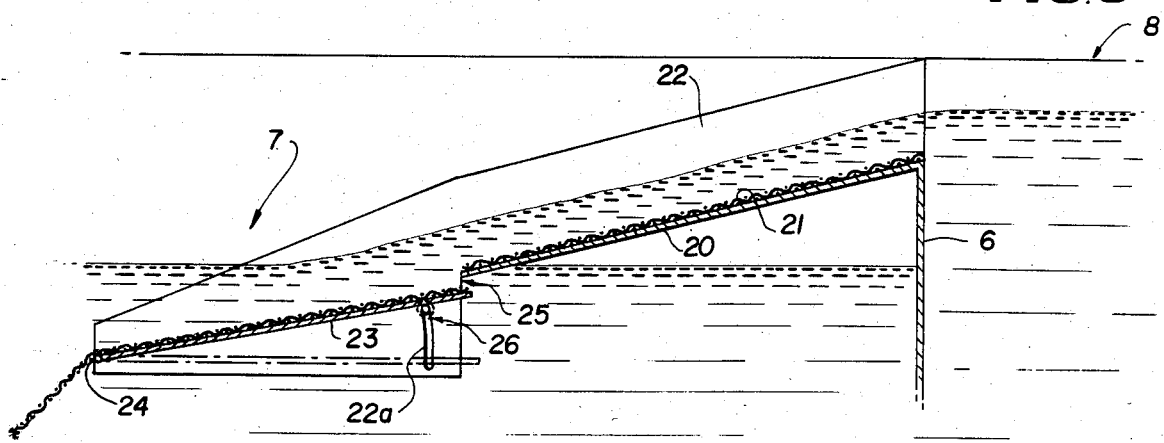

RHEOTACTIC SHRIMP HARVESTER

BACKGROUND OF THE INVENTION

Due to the increase of meat prices, the warm water aquaculture of fresh water prawns or shrimp has become an increasingly active industry for providing a protein food source at reasonable prices.

The three main processors involved in the aquaculture of fresh water shrimp include hatching, larval rearing and the grow-out process. The grow-out process accounts for 95% of the total cost of the cultivation of the shrimp, the two main sources of expense in the grow-out process being harvesting cost and the mortality of the shrimp. Heretofore, the harvesting of the shrimp was accomplished manually by hand nets, a time-consuming process requiring many man hours resulting in large labor costs. The mortality of the shrimp is caused by the resultant injury to the shrimp during the manual harvesting and by the larger shrimp eating the smaller or less developed shrimp.

In order to reduce the cost of the grow-out process, after considerable research and experimentation, the harvester of the present invention has been devised which comprises, essentially, an inclined ramp, having a slot formed therein, extending between adjacent tanks of water. Water is caused to flow down the ramp, whereby the shrimp move upstream thereon, based on the principle of rheotactic response; that is, the tendency for shrimp to naturally travel upstream. The smaller shrimp pass through the slot in the ramp and return to the original tank while the larger shrimp go over the slot and into the next tank. By this construction and arrangement, the shrimp are segregated or sorted by size, the smaller shrimp being in the original tank and the larger shrimp being in the next adjacent tank. By providing a series of tanks having inclined ramps extending between adjacent tanks in the series and with each ramp having a progressively larger slot than the previous ramp in the series, the sorting of the shrimp can be accomplished whereby the smallest shrimp are contained in the first tank and the largest shrimp are contained in the last tank in the series, while the various sized shrimp are contained in the respective tanks between the first and last.

BRIEF DESCRIPTION OF THE DRAWINGS

FIG. 1 is a perspective view of one embodiment of the present invention;

FIG. 2 is a view taken along line 2—2 of FIG. 1;

FIG. 3 is a sectional side elevational view of the tank shown in FIG. 1 illustrating another embodiment of the slotted ramp;

DESCRIPTION OF THE PREFERRED EMBODIMENTS

Figure 4:
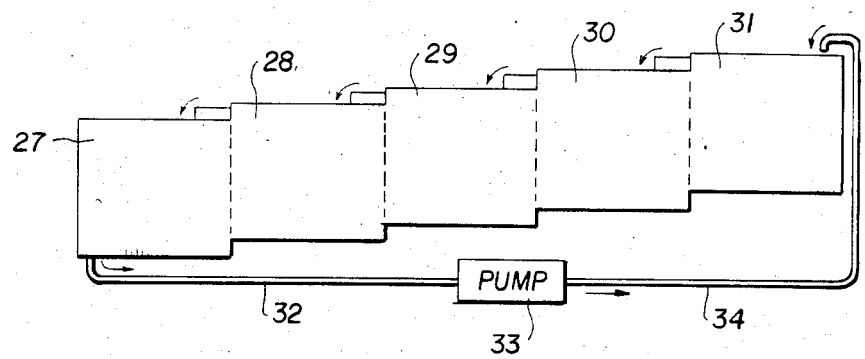
FIG. 4 is a diagrammatic view illustrating a series of tanks employing the harvester of the present invention.

Referring to the drawings, and more particularly to FIGS. 1 and 2 thereof, the rheotactic shrimp harvester of the present invention comprises, a tank of water 1 including side walls 2 and 3 and end walls 4 and 5. A partition 6 extends transversely of the tank 1 between the side walls 2 and 3 to thereby divide the tank 1 into a pair of adjacent tanks 7 and 8, wherein the water level 9 in tank 8 is maintained higher than the water level 10 in tank 7. The medial portion 6a of the partition 6 terminates below the upper edge 6b thereof, and a horizontally disposed floor 11 is integrally connected at one end thereof to the medial portion 6a of the partition 6, the opposite end of the floor having an inclined ramp 12 rigidly connected thereto. A pair of side walls 13 and 14 are integrally connected to the floor 11 and partition 6, each wall having an opening 13a, 14a provided therein. One end of a ramp 15 is pivotally connected, as at 15a, to the floor 11, the opposite end of the ramp 15 cooperating with the floor 11 to form an opening or slot 16. The ramp 15 can be adjusted in the direction of the arrows 17, FIG. 2, to vary the size of the slot 16.

In use, water is caused to flow from tank 8 over ramp 15, onto floor 11 and down ramp 12. Shrimp 17, 18 contained in tank 7 move upwardly on ramp 12 because of their natural tendency to move upstream. The larger shrimp 17 travel over the slot 16 onto the ramp 15, and into the tank 8, while the smaller shrimp 18 travel through the slot 16, onto the floor 11, and through the openings 13a and 14a back into the tank 7. A fabric 20 is placed on the floor 11 and ramp 12 to provide a friction surface to thereby facilitate the traverse of the shrimp on the ramp assembly.

Another embodiment of the slotted ramp assembly is shown in FIG. 3, wherein an inclined ramp 21 is rigidly connected to the medial portion of the partition 6, and extends downwardly between side walls 22 secured to the partition 6 in the same manner as side walls 13, 14 in the embodiment shown in FIG. 1. Another inclined ramp 23 is pivotally connected at its lower end to the side walls 22 as at 24. The upper end of the ramp 23 cooperates with the lower end of ramp 21 to provide a slot or opening 25, the size of which can be varied by pivoting the ramp 23 from the full line position to the dotted line position as shown in FIG. 3. The ramp is held in the adjusted position by a nut and bolt assembly 26 connected to the ramp 23 and extending through arcuate slots 22a formed in the side walls 22.

The ramp assembly illustrated in FIG. 3 functions in the same fashion as described hereinabove in conjunction with the ramp assemblty shown in FIGS. 1 and 2; namely, the shrimp travel upwardly on ramp 23 against the flow of water, the larger shrimp travel onto the ramp 21 and into the tank 8, while the smaller shrimp pass through the slot 25 and back into the tank 7.

While the rheotactic shrimp harvester has been described for use between a pair of tanks, the harvester is readily adapted for use in a series of tanks as shown in FIG. 4. In this arrangement, the series of adjacent ramps or tanks 27, 28, 29, 30, 31 are arranged in progressively higher elevations and having a water return line 32 connected between the lowest tank 27 and a circulating pump 33, the outlet of which being connected to a piece line 34 connected to the highest tank 31. The slotted ramp assemblies of either FIGS. 1 or 3 are provided between adjacent tanks 27, 28; 28, 29; 29, 30; and 30, 31, with the slots 16 or 25 adjusted to provide a progressively larger opening from the first tank 27 to the last tank 31. By this construction and arrangement, the smallest shrimp will remain in tank 27 while the larger shrimp will progress sequentially through the series of tanks with the largest shrimp traveling to the last tank 31.

Figure 5:
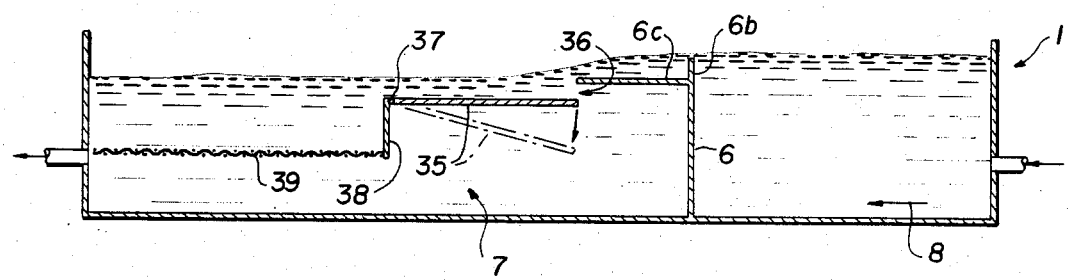
FIG. 5 is a sectional, side elevational view of yet another embodiment of the present invention.

Another embodiment of the harvester is shown in FIG. 5, wherein the partition 6 extends continuously across the tank 1, whereby the top edge 6b of the partition forms a weir for maintaining the level of water higher in tank 8 than the water level in tank 7. A horizontally disposed shelf 6c is integrally connected to the partition 6 in proximity to the upper edge thereof, the free edge of the shelf 6c cooperating with the free end of a ramp 35 to form a slot or opening 36. The opposite end of the ramp 35 is pivotally connected as at 37 to the top edge portion of a vertically disposed frame member 38 extending between and secured to the side walls of the tank 1, a screen 39 being mounted between the lower edge portion of frame member 38 and the end wall of the tank 1.

In use, the shrimp are initially on top of the screen 39. In response to the flow of water from tank 8 to tank 7, the shrimp travel upstream onto ramp 35 wherein the larger ones travel over the slot 36, onto shelf 6c, and into tank 8. The smaller shrimp pass through slot 36 back into tank 7, whereby the screen 39 keeps these smaller shrimp separated from the remaining shrimp on top of the screen.

Figure 6:
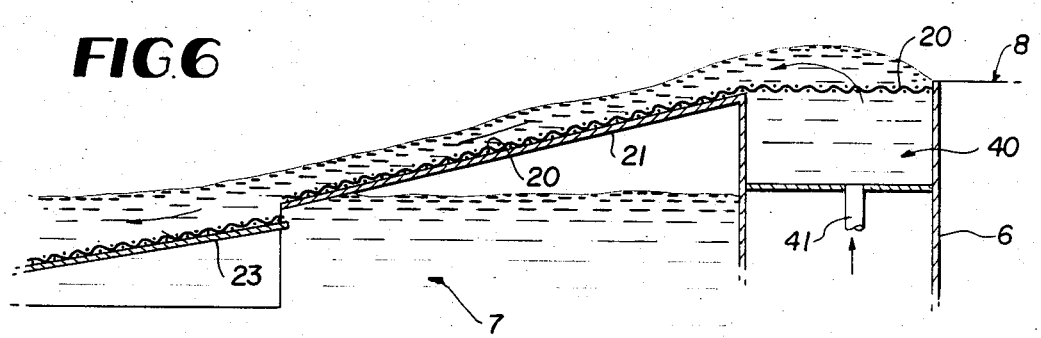
FIG. 6 is a sectional, side elevational view of an embodiment for causing water flow in the harvester.
Figure 7:
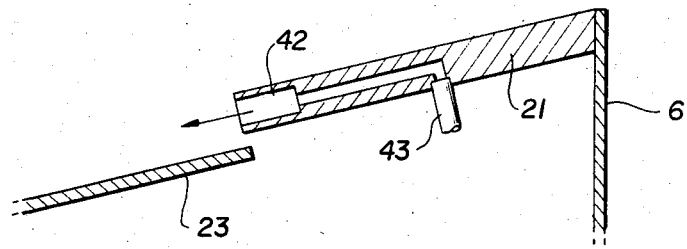
FIG. 7 is a sectional, side elevational view of another embodiment for causing water flow in the harvester.

FIGS. 6 and 7 illustrate water supply embodiments for providing the flow of water to the ramp assembly of FIG. 3. In FIG. 6, a header box 40 is provided between the partition 6 and the top edge of the ramp 21, water being supplied to the box through inlet pipe 41. The fabric 20 extends over the top of the header box to not only provide a filter for the water overflowing the header box onto the ramp 21 but also to provide a support surface for the shrimp traveling into tank 8.

In FIG. 7, the ramp 21 is provided with a plurality of laterally spaced bores or passages 42 forming nozzles, water being supplied to the nozzles by an inlet pipe 43, whereby water flows through the nozzles onto the ramp 23.

It has been found that to provide the best conditions to facilitate the migration of the shrimp from one tank to another, the water temperature should be 23 degrees C. (73.4 degrees F.) and the water should flow down the ramp assembly at a rate between 0.4 ft/sec and 1.2 ft/sec. The depth of the water on the ramp assembly is the lowest possible, approximately 0.25" which is just enough to allow the shrimp to sense the water flow.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A rheotactic shrimp harvester comprising, a first tank adjacent a second tank, ramp means extending between said tanks, slot means provided in said ramp means, water contained in said tanks, means supplying water to said second tank to maintain the water level in said second tank higher than the water level in said first tank, whereby the water flows from the second tank into said ramp means and into said first tank, and shrimp to be harvested being contained in said first tank, whereby the shrimp reacting to the current of water flowing down the ramp means migrate upstream on the ramp means, the smaller shrimp passing through the slot means and returning to said first tank while the larger shrimp go over the slot means and into said second tank.

2. A rheotactic shrimp harvester according to claim 1, wherein the ramp means comprises, a partition forming a common wall between said adjacent tanks, the medial portion of said partition terminating below the upper edge of said partition, a horizontally disposed floor intergrally connected at one end thereof to the medial portion of the partition on the side of the partition facing said first tank, a first inclined ramp rigidly connected to the opposite end of said floor, a pair of side walls integrally connected to the sides of said floor and said partition, an opening provided in each side wall, a second ramp positioned over said floor, means pivotally connecting one end of said second ramp to said floor adjacent the medial portion of said partition, the opposite end of said second ramp cooperating with said floor to form a slot communicating with said openings, whereby the smaller shrimp pass through said slot and openings and back into said first tank, while the larger shrimp move over the slot onto the second ramp and into said second tank.

3. A rheotactic shrimp harvester according to claim 1, wherein a fabric surface is provided on the floor and said first ramp to facilitate the shrimp's travel thereon.

4. A rheotactic shrimp harvester according to claim 1, wherein the ramp means comprises, a partition forming a common wall between said adjacent tanks, the medial portion of said partition terminating below the upper edge of said partition, a first inclined ramp rigidly connected at one end thereof to the medial portion of the partition on the side of the partition facing said first tank, said first ramp extending downwardly into said first tank, a pair of side walls connected to the side of said first ramp and said partition, a second inclined ramp, means pivotally connected the lower end of said second ramp to said side walls, the upper end of said second ramp cooperating with the lower end of said first ramp to form a slot therebetween communicating with said tank whereby the smaller shrimp pass through the slot and return to the first tank while the larger shrimp pass over the slot and travel up the first ramp and into the second tank.

5. A rheotactic shrimp harvester according to claim 4, wherein a fabric surface is provided on the first and second ramps to facilitate the shrimp's travel thereon.

6. A rheotactic shrimp harvester according to claim 4, wherein adjacent means are connected to the second ramp for adjusting the position of the upper end of the second ramp relative to the lower end of the first ramp whereby the size of the slot can be varied.

7. A rheotactic shrimp harvester according to claim 6, wherein the adjustment means comprises arcuate slots formed in the side walls, and nut and bolt assemblies connected to the second ramp and extending through said arcuate slots.

8. A rheotactic shrimp harvester according to claim 1, wherein the ramp means comprises a partition providing a common wall between said adjacent tanks, the top edge of said partition forming a weir for maintaining the level of water higher in said second tank than the water level in said first tank, a horizontally disposed shelf connected at one edge to the upper edge portion of said parition on the side thereof facing said first tank, a transversely extending frame member connected to the side walls of said first tank, a ramp, means pivotally connecting one end of said ramp to the upper edge of said frame member, the opposite edge of said shelf cooperating with the free end of said ramp to form a slot communicating with said first tank, and a screen extending between the lower edge of said frame member and an end wall of said first tank for supporting shrimp to be harvested, whereby the smaller shrimp pass through the slot and into the first tank to thereby be separated from the remaining shrimp on the screen.

9. A rheotactic shrimp harvester comprising a plurality of tanks arranged in a series, each tank in the series being adjacent a next tank in the series, ramp means extending between adjacent tanks in said series, water contained in said tanks, means supplying water to the last tank in said series to maintain the water level in the last tank higher than the water levels in the remaining tanks in the series to thereby maintain a flow of water from the last tank down each of the ramp means to the first tank, water circulation means connected between the first tank and the last tank, adjustable slot means provided in each ramp means, each slot means having a progressively larger opening than the previous ramp in the series to accommodate correspondingly sized shrimp, whereby the smallest shrimp remain in the first tank and the largest shrimp migrate to the last tank while the various sized shrimp are contained in the respective tanks between the first and last.

10. A rheotactic shrimp harvester comprising, a first tank adjacent a second tank, ramp means extending between said tanks, slot means providec in said ramp means, water contained in said tanks, means supplying water to said ramp means, and shrimp to be harvested being contained in said first tank, whereby the water flows down the ramp means into said first tank, and the shrimp reacting to the current of water flowing down the ramp means migrate upstream on the ramp means, the smaller shrimp passing through the slot means and returning to said first tank while the larger shrimp travel over the slot means and into the second tank.

11. A rheotactic shrimp harvester according to claim 10, wherein the means for supplying water to said ramp means comprises a header box having a water inlet mounted at the upper end of said ramp means, whereby the water overflows the header box onto said ramp means.

12. A rheotactic shrimp harvester according to claim 11, wherein a fabric is mounted on said ramp means and extending over the top of said header box, whereby the fabric functions as a filter for the water overflowing the header box and as a support surface for the shrimp migrating over the header box into the second tank.

13. A rheotactic shrimp harvester according to claim 10, wherein the means for supplying water to said ramp means comprises, a plurality of laterally spaced bores in said ramp means forming nozzles, a water inlet connected to said nozzles, whereby the water flows through said nozzles onto the ramp means.

14. A rheotactic shrimp harvester according to claim 10, wherein the water flows down the ramp assembly at a rate between 0.4 ft/sec and 1.2 ft/sec.

15. A rheotactic shrimp harvester according to claim 14, wherein the temperature of the water is 23 degrees C.

16. A rheotactic shrimp harvester according to claim 15, wherein the depth of the water flowing down the ramp means is 0.25".

* * * * *